W. B. KOUWENHOVEN.
ELECTRICAL BATTERY AND BULB TESTER.
APPLICATION FILED JULY 10, 1920.
1,380,809.
Patented June 7, 1921.
2 SHEETS—SHEET 2.
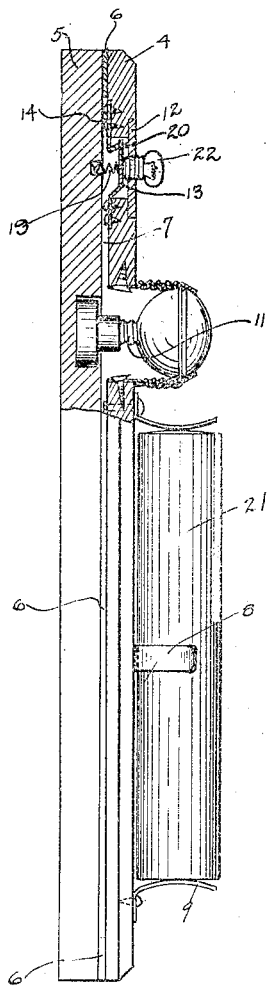
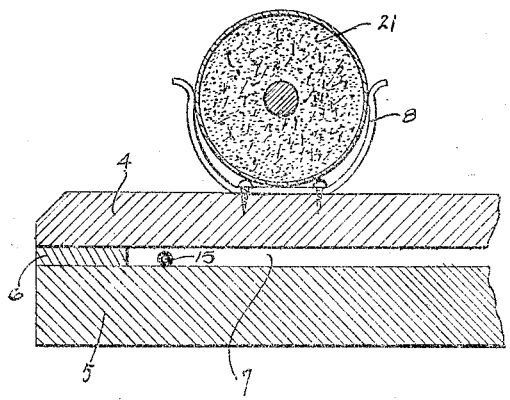
Inventor
William B. Kouwenhoven

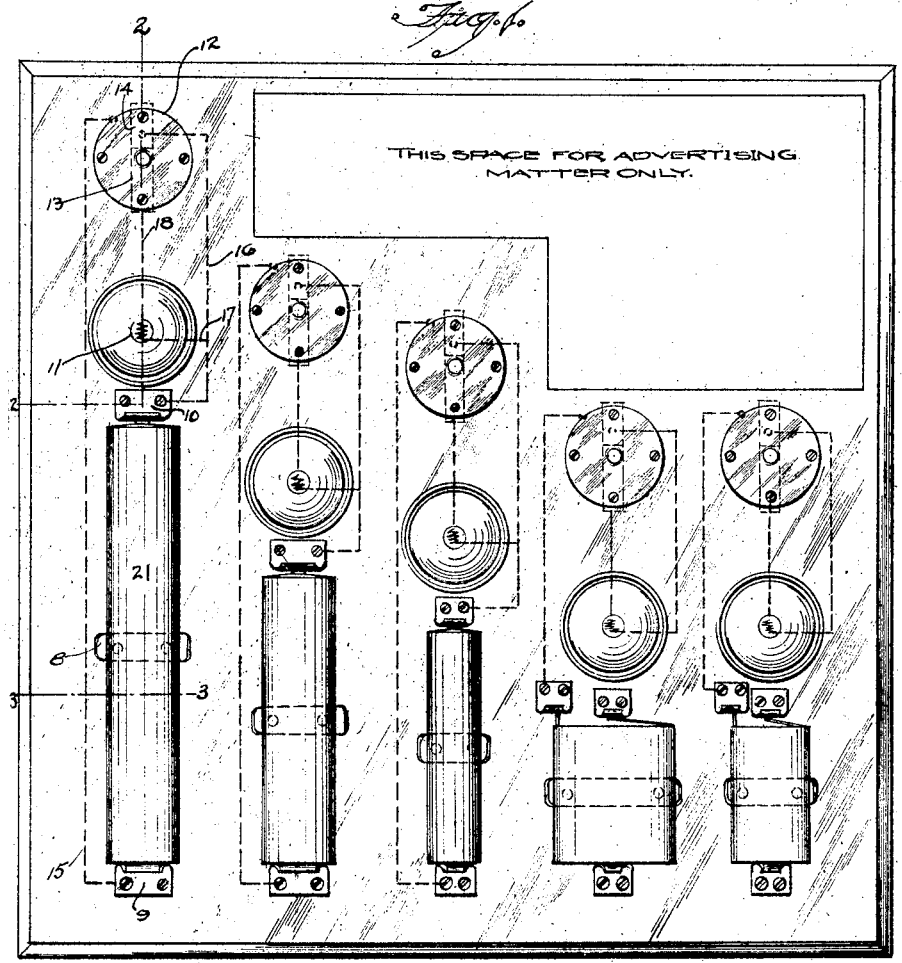

UNITED STATES PATENT OFFICE.

WILLIAM B. KOUWENHOVEN, OF BALTIMORE, MARYLAND, ASSIGNOR TO WINCHESTER REPEATING ARMS CO., OF NEW HAVEN, CONNECTICUT, A CORPORATION.

ELECTRICAL BATTERY AND BULB TESTER.

1,380,809. Specification of Letters Patent. Patented June 7, 1921.

Application filed July 10, 1920. Serial No. 395,404.

*To all whom it may concern:*

Be it known that I, WILLIAM B. KOUWENHOVEN, a citizen of the United States, residing at Baltimore, in the county of Baltimore and State of Maryland, have invented a new and useful Improvement in Electrical Battery and Bulb Testers; and I do hereby declare the following, when taken in connection with the accompanying drawings and the characters of reference marked thereon, to be a full, clear, and exact description of the same, and which said drawings constitute part of this application, and represent, in—

Figure 1 a plan view of an electrical battery- and bulb-tester embodying my invention.

Fig. 2 a view thereof partly in end elevation and partly in vertical section on the line 2—2 of Fig. 1.

Fig. 3 an enlarged view in transverse section on the line 3—3 of Fig. 1.

My invention relates to an improved electrical battery- and bulb-tester for use in all stores where batteries and bulbs for flashlight use are retailed to the general public, the object being to provide simple, convenient and speedy means of testing batteries and bulbs at the moment of sale, whereby the consumer is assured of the freshness of the battery purchased and the unbroken condition of the bulb.

With these ends in view, my invention consists in an electrical battery- and bulb-tester having certain details of construction and combinations of parts as will be hereinafter described and pointed out in the claims.

In carrying out my invention, as herein shown, I employ a rectangular panel consisting of front and back panel-boards 4 and 5 spaced apart by a strip 6, whereby a narrow wiring-space 7 is produced between them. The size of the panel will be regulated by the number of testing units it is desired to install upon it, while the number of these testing units will depend upon the number of sizes of batteries carried in stock by any given store. The panel chosen for illustration has five testing units installed upon it. All of these are identical in character, varying only in dimensions. The description of one will, therefore, suffice for the description of all. For the purpose of this description, the left-hand unit will be chosen.

This unit consists of a battery clip 8, a lower battery-contact 9, an upper battery-contact 10, a battery test-lamp 11, a disk-shaped outer bulb-contact 12 having a central opening adapted to receive the stem of a bulb, an intermediate bulb-contact 13 (Fig. 2) and an inner bulb-contact 14. The lower battery-plate 9 is connected by a wire 15 passing upward through the wiring-space 7, with the outer lamp-contact 12, while the upper contact-plate 10 is connected by a wire 16 also located in the space 7 with the inner bulb-contact 14. A branch wire 17 from the wire 16 leads to one of the terminals of the test-lamp 11, from the other terminal of which a wire 18 leads to the intermediate bulb-contact 13, which is normally pressed by a spring 19 against a contact-point 20 upon the inner face of the outer bulb-contact 12, whereby the intermediate bulb-contact 13 is normally held out of contact with the inner bulb-contact 14.

When a battery 21 is inserted between the upper and lower battery-contact plates 9 and 10, in which position it is held by the clip 8, a circuit is completed through it and the test-lamp 11, the latter lighting up if the battery is in good condition. In this way, the battery itself is tested to ascertain whether or not it has deteriorated since first made.

To test a lamp-bulb, a good battery is first placed in position, after which the bulb to be tested, such as 22, is inserted into the central opening of the outer bulb-contact 12, whereby the stem of the bulb to be tested forces the intermediate bulb-contact 13 out of contact with the outer bulb-contact plate 12 and into contact with the inner bulb-contact plate 14. The circuit through the test-lamp 11 is thus broken and established through the bulb 22 to be tested. If the bulb to be tested is in good condition, it will light up satisfactorily.

My apparatus thus provides convenient and speedy means of testing either a battery or a bulb in the presence of the intending purchaser.

I claim:

1. An electrical battery- and bulb-tester, comprising a panel mounting a testing-unit having upper and lower battery-contact plates, a testing-lamp, and inner, outer and intermediate bulb-contact plates, all connected by wires housed within the said panel.

2. An electrical battery- and bulb-tester, comprising a panel consisting of inner and outer boards spaced apart to produce a wiring-space between them, the outer board mounting a testing unit comprising upper and lower battery-contact plates, a testing-lamp, an inner, outer, and intermediate bulb-contact plates, all connected by wires located in the said wiring-space.

3. An electrical battery- and bulb-tester, comprising a panel and a plurality of independently organized testing units differentiated in size and each comprising two battery-contacts, a testing-lamp, and inner, outer, and intermediate bulb-contacts, all connected by wires housed within the panel, the battery connections being normally closed through the testing-lamp, and the introduction of a bulb to be tested cutting out the testing-lamp and closing the circuit through the bulb to be tested.

In testimony whereof, I have signed this specification in the presence of two subscribing witnesses.

WILLIAM B. KOUWENHOVEN.

Witnesses:
ERIK S. PALMER,
A. E. HODGSON.